(12) United States Patent
Kahlbaum et al.

(10) Patent No.: US 11,794,540 B2
(45) Date of Patent: Oct. 24, 2023

(54) TECHNOLOGIES FOR A HARNESS CONNECTOR WITH INTEGRATED WIRELESS TRANSCEIVER

(71) Applicant: Clarion Corporation of America, Cypress, CA (US)

(72) Inventors: Robert Kahlbaum, Ypsilanti, MI (US);
Valerie Zelko Byrd, Novi, MI (US);
Peter Burke, Waterford, MI (US);
Leslie Tuckey, South Lyon, MI (US);
Andrew Lakin, Livonia, MI (US);
Rushikesh Amin, Canton, MI (US)

(73) Assignee: Clarion Corporation of America, Cypress, CA (US)

( * ) Notice: Subject to any disclaimer, the term of this patent is extended or adjusted under 35 U.S.C. 154(b) by 381 days.

(21) Appl. No.: 17/081,224

(22) Filed: Oct. 27, 2020

(65) Prior Publication Data
US 2022/0126637 A1 Apr. 28, 2022

(51) Int. Cl.
*H04W 4/38* (2018.01)
*H04B 1/3822* (2015.01)
*B60D 1/64* (2006.01)
*B60R 11/04* (2006.01)
*B60R 16/033* (2006.01)
*B60R 11/00* (2006.01)

(52) U.S. Cl.
CPC ............... *B60D 1/64* (2013.01); *B60R 11/04* (2013.01); *B60R 16/033* (2013.01); *H04B 1/3822* (2013.01); *B60R 2011/004* (2013.01); *B60R 2011/007* (2013.01)

(58) Field of Classification Search
CPC .. B60D 1/64; B60D 1/62; B60R 11/04; B60R 16/033; B60R 2011/004; B60R 2011/007; H01R 31/065; H01R 13/6658; H04B 1/3822; H04B 1/38; H04B 1/3827; H04W 4/38; H04W 4/46; H04W 4/80
See application file for complete search history.

(56) References Cited

U.S. PATENT DOCUMENTS 5,442,810 A * 8/1995 Jenquin .................. B60T 17/04
455/66.1
2008/0303648 A1* 12/2008 Day ......................... B60D 1/62
340/431

(Continued)

FOREIGN PATENT DOCUMENTS

EP 3855629 A1 7/2021
WO 2016028818 A1 2/2016

OTHER PUBLICATIONS

Extended European Search Report for European Patent App. No. 21203321.1 dated Mar. 25, 2022, 9 pages.

*Primary Examiner* — Andrew Wendell
(74) *Attorney, Agent, or Firm* — BARNES & THORNBURG LLP (57) ABSTRACT

Technologies for a harness connected with an integrated wireless transceiver are disclosed. In the illustrative embodiment, an in-line connector with an integrated wireless transceiver is inserted between a vehicle connector and a trailer connector of a trailer wiring harness assembly. The wireless transceiver connects to a wireless sensor such as a camera and passes the sensor data to the vehicle connector. Connections from the trailer connector designated for video or other sensor data may not be connected to corresponding connections of the vehicle connector.

19 Claims, 4 Drawing Sheets

(56) References Cited

U.S. PATENT DOCUMENTS

| | | | |
|---|---|---|---|
| 2011/0254679 A1* | 10/2011 | Todd | B60T 17/221 |
| | | | 73/121 |
| 2016/0052453 A1 | 2/2016 | Nalepka | |
| 2017/0217372 A1* | 8/2017 | Lu | H04N 7/181 |
| 2018/0244200 A1 | 8/2018 | Moeller | |
| 2019/0111899 A1* | 4/2019 | Lange, III | H01R 13/665 |
| 2019/0152282 A1 | 5/2019 | Spengler | |
| 2019/0176687 A1* | 6/2019 | Nagata | B60W 40/13 |
| 2019/0337499 A1 | 11/2019 | Hiller | |
| 2020/0108775 A1 | 4/2020 | Murad | |
| 2021/0070362 A1* | 3/2021 | Xu | B62D 15/025 |
| 2021/0111921 A1* | 4/2021 | Jiang | H04L 12/40019 |
| 2021/0213878 A1* | 7/2021 | Schondorf | H04N 23/63 |
| 2021/0229510 A1 | 7/2021 | Balton | |
| 2023/0007726 A1* | 1/2023 | Chang | G08G 1/164 |

* cited by examiner

TECHNOLOGIES FOR A HARNESS CONNECTOR WITH INTEGRATED WIRELESS TRANSCEIVER

BACKGROUND

A trailer wiring harness assembly can connect a vehicle to a trailer attached to the vehicle. The trailer wiring harness assembly may provide connections for power, lights, turn signals, etc. In some cases, a trailer wiring harness assembly may provide connections for a sensor that is wired to the trailer wiring harness assembly.

SUMMARY

According to one aspect of the disclosure, an in-line connector for a trailer wiring harness assembly comprises a first connector configured to mate with a vehicle connector of a trailer wiring harness assembly; a second connector configured to mate with a trailer connector of a trailer wiring harness assembly; an antenna; a wireless transceiver connected to the antenna and configured to wirelessly receive a sensor signal from a wireless sensor through the antenna; one or more wires connecting the wireless transceiver to the first connector, wherein the wireless transceiver is configured to pass the sensor signal through the first connector to the vehicle connector.

In some embodiments, the in-line connector may further include the wireless sensor, wherein the wireless sensor is a wireless camera.

In some embodiments, the wireless camera is battery-powered.

In some embodiments, the in-line connector may further include the wireless sensor, wherein the wireless sensor is an audio sensor, an ultrasound sensor, a radar sensor, or a lidar sensor.

In some embodiments, the wireless sensor is battery-powered.

In some embodiments, each of the first connector and the second connector has an SAE J3008 interface.

According to one aspect of the disclosure, a system comprises the in-line connector of claim 1, and further comprises a vehicle comprising the vehicle connector.

According to one aspect of the disclosure, a system comprising the in-line connector of claim 1, further comprises a trailer comprising the trailer connector.

According to one aspect of the disclosure, a connector for a trailer wiring harness assembly is configured to mate with a corresponding connector of a trailer wiring harness assembly and comprises an antenna; a wireless transceiver connected to the antenna and configured wirelessly receive a sensor signal from a wireless sensor through the antenna; and one or more wires connected to the wireless transceiver.

In some embodiments, the connector is a trailer connector of a trailer wiring harness assembly configured to mate with a vehicle connector of a trailer wiring harness assembly, wherein the wireless transceiver is configured to pass the sensor signal through the trailer connector to the vehicle connector.

In some embodiments, the connector is a vehicle connector of a trailer wiring harness assembly configured to mate with a trailer connector of a trailer wiring harness assembly, wherein the wireless transceiver is configured to pass the sensor signal through the one or more wires to a vehicle compute device, wherein one or more signals of the trailer connector are not passed to a vehicle wiring harness connected to the vehicle connector.

In some embodiments, the connector may further include the wireless sensor, wherein the wireless sensor is a wireless camera.

In some embodiments, the connector may further include the wireless sensor, wherein the wireless sensor is an audio sensor, an ultrasound sensor, a radar sensor, or a lidar sensor.

In some embodiments, the connector has an SAE J3008 interface.

According to one aspect of the disclosure, a system comprises the in-line connector of claim 1, further comprising a vehicle comprising the vehicle connector; and a trailer comprising the trailer connector.

According to one aspect of the disclosure, a method for connecting a wireless sensor to a vehicle comprises assembling a trailer wiring harness assembly by connecting an in-line connector to a vehicle connector of the vehicle and connecting the in-line connector to a trailer connector of a trailer; securing the wireless sensor to the trailer; wirelessly linking a wireless transceiver of the in-line connector to the wireless sensor; wirelessly transmitting a sensor signal from the wireless sensor to the wireless transceiver; and passing, by the in-line connector, the sensor signal to the vehicle connector of the vehicle.

In some embodiments, the wireless sensor is a wireless camera.

In some embodiments, the wireless sensor has a magnetic base, wherein securing the wireless sensor comprises attaching the wireless sensor to the trailer by the magnetic base.

In some embodiments, the wireless sensor is battery-powered, wherein the wireless sensor does not have any wires attached to it while transmitting the sensor signal to the wireless transceiver.

In some embodiments, the in-line connector has one or more SAE J3008 interfaces.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
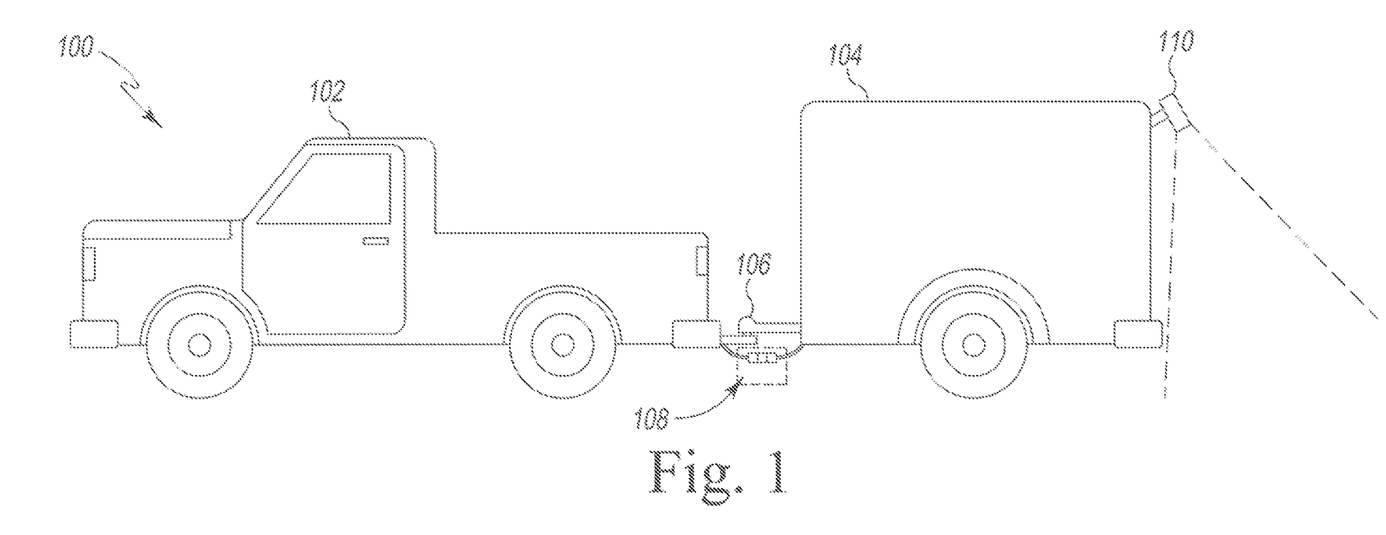
FIG. 1 is a simplified diagram of at least one embodiment of a vehicle connected to a trailer by a trailer wiring harness assembly that has an in-line connector with an integrated wireless transceiver.

Referring now to FIG. 1, an illustrative system 100 includes a vehicle 102 connected to a trailer 104. The trailer 104 is connected to the vehicle 102 by a trailer hitch assembly 106 that secures the trailer 104 to the vehicle 102. The trailer 104 is also connected to the vehicle 102 by a trailer wiring harness assembly 108. The trailer wiring harness assembly 108 provides various electrical connections between the vehicle 102 and the trailer 104, such as power, lights, turn signals, etc.

Figure 2:
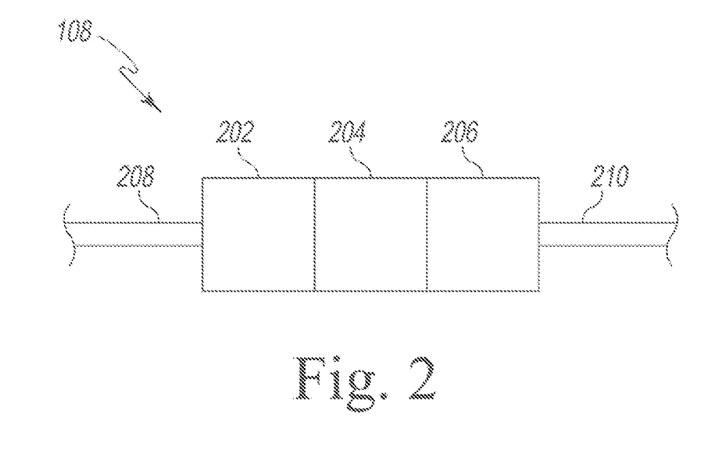
FIG. 2 is a close-up view of a portion of the trailer wiring harness assembly of FIG. 1.

In use, in the illustrative embodiment, the trailer wiring harness assembly 108 includes a vehicle connector 202, an in-line connector 204, and a trailer connector 206, as shown in FIG. 2. The in-line connector 204 includes an integrated wireless transceiver that is connected to a wireless camera 110 or other sensor secured to the trailer 104. The in-line connector 204 receives a signal from the wireless camera 110 and passes it through to the vehicle connector 202.

It should be appreciated that, in some embodiments, the vehicle connector 202 may be configured to mate directly with the trailer connector 206, and both the vehicle connector 202 and the trailer connector 206 may have one or more wires or pins specified for carrying a video signal from a wired camera through the trailer wiring harness assembly 108. In such embodiments, inserting the in-line connector 204 may break the connection between the vehicle connector 202 and the trailer connector 206 for the one or more wires or pins specified for carrying a video signal and maintain the connection between every other pin or wire of the vehicle connector 202 and the trailer connector 206.

It should further be appreciated that use of the in-line connector 204 with an integrated wireless transceiver provides certain benefits over other possible options. For example, a wireless camera 110 may not be able to connect or may not be able to connect as strongly to a wireless transceiver located, e.g., near a driver of the vehicle 102 due to both shielding of the vehicle 102 and increased distance. As another example, a wired camera would require a cable to be installed along the entire length of the trailer 104 to the desired position of the wired camera.

The vehicle 102 may be any suitable vehicle that can be connected to a trailer 104. For example, the vehicle 102 may be a car, a van, a truck, a tractor unit, a recreational vehicle (RV), an all-terrain vehicle (ATV), etc. The trailer 104 may be any suitable trailer, such as a semi-trailer, a full trailer, etc. In some embodiments, the trailer 104 may be a piece of equipment, such as a plow or other agricultural equipment. The trailer hitch assembly 106 may be any suitable means for connecting the trailer 104 to the vehicle 102. For example, the trailer hitch assembly 106 may be a fifth wheel coupling, a bumper-pull hitch with a ball mount, etc.

As used herein, a trailer wiring harness assembly 108 refers two or more connectors configured to be mated together (such as the vehicle connector 202, the in-line connector 204, and the trailer connector 206), at least a portion of a wiring harness, such as a vehicle wiring harness 208 extending from the vehicle connector 202 or a trailer wiring harness 210 extending from the trailer connector 206. It should be appreciated that, in some embodiments, the vehicle connector 202 may be integrated into the vehicle 102, as opposed to being connected to the vehicle 102 by the vehicle wiring harness 208. In other embodiments, the trailer connector 206 may be integrated into the trailer 104, as opposed to being connected to the trailer 104 by the trailer wiring harness 210. In some embodiments, the in-line connector 204 may including a wiring harness between a connector configured to mate with the vehicle connector 202 and a connector configured to mate with the trailer connector 206.

Each of the vehicle wiring harness 208 and the trailer wiring harness 210 includes two or more wires or cables bound together, such as by rubber, vinyl, electrical tape, conduit, zip ties, etc. The vehicle wiring harness 208 and the trailer wiring harness 210 may include any suitable number of wires, such as any number from 2-30. Each of the vehicle wiring harness 208 and/or the trailer wiring harness 210 may include one or more twisted pairs of wires and/or one or more coaxial cables. It should be appreciated that each of the vehicle wiring harness 208 and the trailer wiring harness 210 bundles two or more wires or cables together for a suitable length, such as may be needed to route the wires or cables to a suitable location of the chassis of the vehicle 102 or trailer 104.

In the illustrative embodiment, the wireless camera 110 is connected to the rear of the trailer 104 to provide a view behind the trailer 104, such as for use as a back-up camera. Additionally or alternatively, in some embodiments, the wireless camera 110 may be placed in other locations, such as at the top or bottom of the rear of the trailer 104, at the top or bottom of the left or right side of the trailer 104, at the top or bottom of the front of the trailer 104, in the inside of the trailer 104, etc. In some embodiments, the wireless camera 110 can be placed on the vehicle 102, such as near the trailer hitch assembly 106 or other suitable location.

In the illustrative embodiment, the wireless camera 110 is secured to the trailer 104 by one or more magnets in the wireless camera 110 and may be powered by a battery, such as a rechargeable or non-rechargeable battery. As such, in such an embodiment, installation and rearranging the wireless camera 110 can be as simple as manually detaching the wireless camera 110 from the trailer 104 and placing it in another location on the trailer 104. Additionally or alternatively, in some embodiments, the wireless camera 110 may be secured to the trailer 104 in a different manner, such as using a screw, bracket, or other fastener, using an adhesive, using suction, etc. In some embodiments, the wireless camera 110 may be powered by one or more wires, such as a power cable coming through the trailer connector 206. It should be appreciated that the power cable may be shared with other components of the trailer 104, such as interior or exterior lights, so a dedicated wire running from the trailer connector 206 to the wireless camera 110 would not be necessary.

The wireless camera 110 may be any suitable type of camera, such as a CCD or CMOS sensor. The wireless camera 110 may have any suitable resolution, such as a resolution of 640×480, 1280×720, 1920×1080, or 3,840×2,160. The wireless camera 110 may have any suitable field of view in the horizontal or vertical direction, such as anywhere from 10° to 180°. In some embodiments, the wireless camera 110 may be able to zoom in or out, changing the field of view. The wireless camera 110 may have any suitable frame rate, such as 24, 30, 60, or 120 frames per second. The wireless camera 110 may also be able to capture single still images. In some embodiments, the wireless camera 110 may be motion-activated. The wireless camera 110 may be color or black-and-white. In the illustrative embodiment, the wireless camera 110 operates in the visible spectrum. Additionally or alternatively, the wireless camera 110 may operate in the near infrared spectrum. In some embodiments, the wireless camera 110 may include a microphone and may transmit audio data to the wireless transceiver 418, which may in turn transmit the audio data to the vehicle compute device 400.

It should be appreciated that, in some embodiments, there may be additional or different sensors from the wireless camera 110. For example, there may be one or more sound sensors, ultrasound sensors, radar sensors, lidar sensors, etc.

Figure 3:
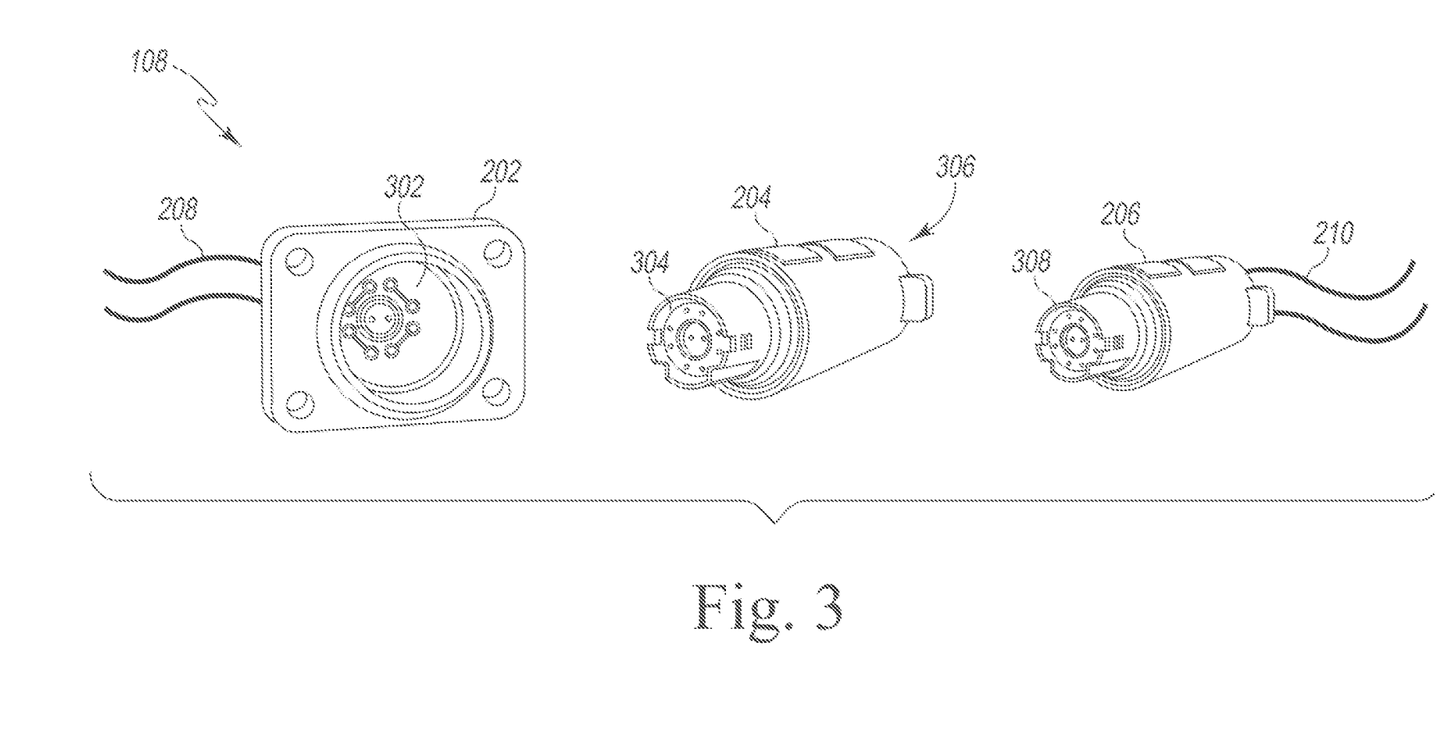
FIG. 3 is a diagram of a disassembled trailer wiring harness assembly.

Referring now to FIG. 3, the vehicle connector 202, the in-line connector 204, and the trailer connector 206 are all shown disassembled from each other. In the illustrative embodiment, the vehicle connector 202 is a female connector with one or more holes 302 lined with or embodied as a conductor configured to mate with one or more pins 304 of a male end of the in-line connector 204 (or with one or more pins 308 of a male trailer connector 206). The in-line connector has a female end with one or more holes 306 configured in a similar manner as the holes 302 that are configured to mate with one or more pins of the male trailer connector 206. Of course, it should be appreciated that, in some embodiments, the vehicle connector 202 may be a male connector and the trailer connector 206 may be a female connector or the connectors may be configured in some other manner.

Figure 4:
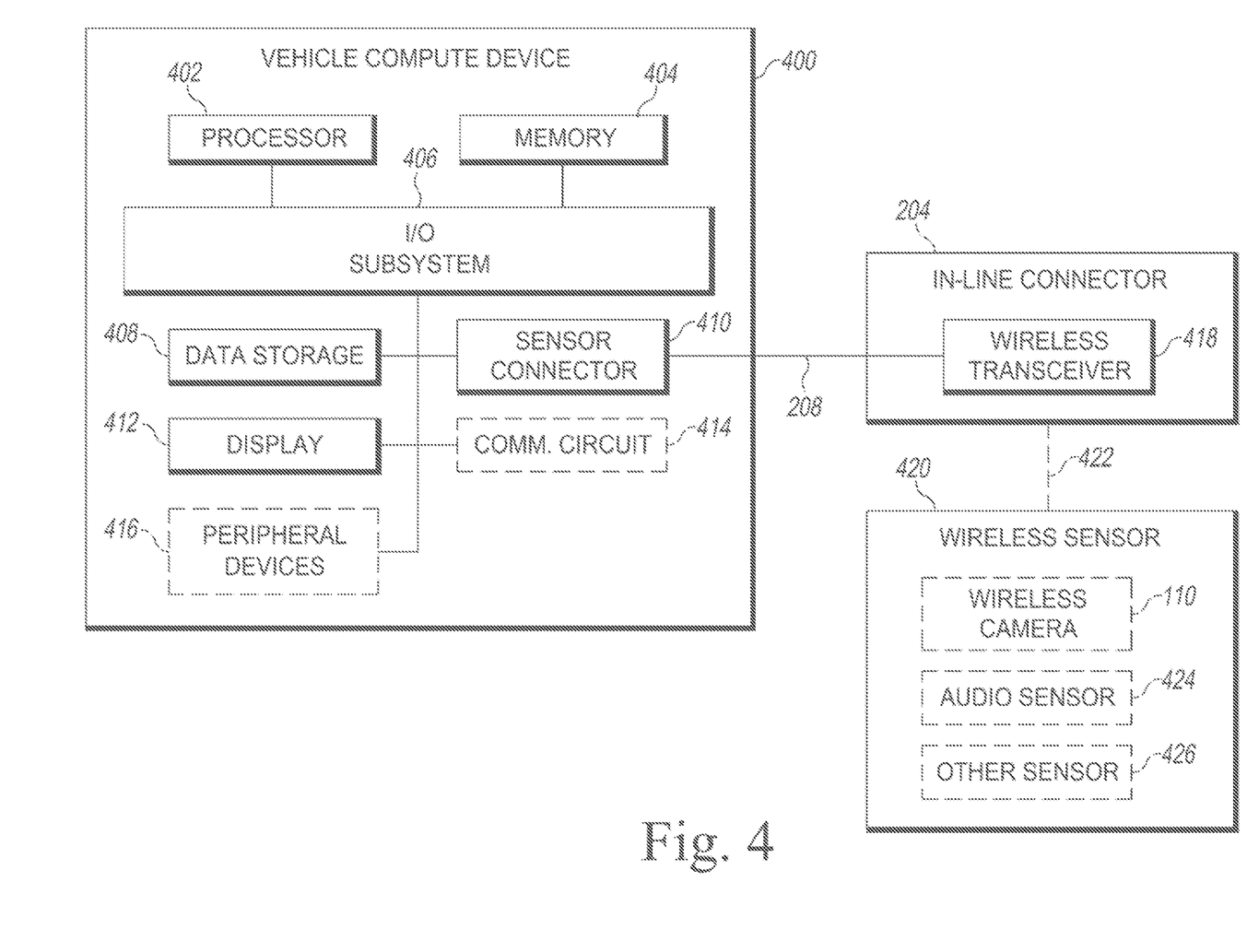
FIG. 4 is a simplified block diagram of a vehicle compute device connected to an in-line connector and wireless sensor.

The in-line connector 204 includes a wireless transceiver, such as the wireless transceiver 418 shown in FIG. 4. The in-line connector 204 may have an integrated antenna and/or may have an external antenna connected to the wireless transceiver 418 for receiving wireless signals. In the illustrative embodiment, one or more pins and/or holes in each of the connectors 202, 204, 206 is designated for carrying a sensor signal, such as a video signal. The wireless transceiver 418 receives a video signal or other sensor signal and passes it along the designated pins 304 of the in-line connector 204 to the corresponding holes 302 of the vehicle connector 202. The holes 306 of the in-line connector 204 corresponding to the video or other sensor signal may not have any conductors in them or may otherwise be disconnected from the corresponding pins 304 that with the holes 302 of the vehicle connector 202 for receiving a video or other sensor signal. As such, any video or other sensor signal coming from the pins 308 may not be used. Alternatively, in some embodiments, holes 306 of the in-line connector 204 corresponding to the incoming video or other sensor signal may be connected to and processed by the wireless transceiver 418. For example, in one embodiment, a first video signal may be passed through the pins 308 of the trailer connector 206 to the wireless transceiver 418, and a second video signal may be wirelessly sent to the wireless transceiver 418. The wireless transceiver 418 may then send both the first video signal and the second video signal to the vehicle connector 202 through one or more pins 304 designated for a video or other sensor signal. It should be appreciated that the wireless transceiver 418 may receive more than one wireless or wired video signal at a time and may be able to pass all of the received signals to the vehicle connector 202. Additionally or alternatively, in some embodiments, the wireless transceiver 418 may be able to selectively transmit one or some of the incoming video signals without transmitting others.

The vehicle connector 202, the in-line connector 204, and the trailer connector 206 may be any suitable type of connector. For example, in the illustrative embodiment, each of the vehicle connector 202, in-line connector 204, and trailer connector 206 is embodied as a connector with an SAE J3008 interface. In such an embodiment, each of the vehicle connector 202, in-line connector 204, and trailer connector 206 may have a pin and/or hole for a power signal, a controller area network (CAN) positive signal, a CAN negative signal, a peripheral sensor interface (PSI5) positive signal, a PSI negative signal, a ground signal, a brake signal, a video shield, a video positive signal, a video negative signal, etc. It should be appreciated that, in some embodiments of either the SAE J3008 interface or other interfaces, some or all of the signals listed above may not be present and/or additional signals may be present. In other embodiments, the various connector may be embodied as any other suitable interface, such as a 7-way traditional interface, a 7-way RV standard interface, a 4-way connector etc. In some embodiments, the vehicle connector 202, the in-line connector 204, and/or the trailer connector 206 may be rated for a level of water proofing and/or may have a cap or guard to prevent water, dirt, or debris from entering the connector when disconnected.

It should be appreciated that, in some embodiments, the wireless transceiver 418 may not be in an in-line connector. For example, in some embodiments, the wireless transceiver 418 may be integrated into the vehicle connector 202 or integrated into the trailer connector 206, and an in-line connector 204 may not be used. In such embodiments, the functionality and connections to the wireless transceiver 418 may be similar to the other embodiments described herein. For example, if the wireless transceiver 418 is integrated into the trailer connector 206, output signals from the wireless transceiver 418 can be connected to pins 308 of the trailer connector 206 and passed to the holes 302 of the vehicle connector 202. In another embodiment, if the wireless transceiver 418 is integrated into the vehicle connector 202, signals from pins 308 of the trailer connector 206 designated for a video signal may disconnected or may be connected to the wireless transceiver 418, which can also receive wireless signals and selectively pass on wireless or wired signals along the vehicle wiring harness 208. Additionally or alternatively, in some embodiments, the wireless transceiver 418 may be located in another part of the trailer 104, such as connected to the trailer wiring harness 210 at a location different from the trailer connector 206.

Referring now to FIG. 4, a vehicle compute device 400 may be inside of or form a part of the vehicle 102. The vehicle compute device 400 may have a wired connection to a wireless transceiver 418 in the in-line connector 204, which is in turn connected to one or more wireless sensors 420 over a wireless connection 422. The vehicle compute device 400 may receive video or other sensor data through the vehicle connector 202 and present it to a user of the vehicle compute device 400.

In the illustrative embodiment, the vehicle compute device 400 may be embodied as an "infotainment" system of the vehicle 102. The illustrative vehicle compute device 400 may be embodied as any type of compute device with a display integrated into the vehicle 102 viewable by a driver of the vehicle 102. Additionally or alternatively, the vehicle compute device 400 may be embodied as any compute device capable of performing the functions described herein. For example, the vehicle compute device 400 may be embodied as or otherwise be included in, without limitation, an embedded computing system, an embedded computing system, a System-on-a-Chip (SoC), a smartphone, a cellular phone, a tablet computer, a notebook computer, a laptop computer, a wearable computer, a server computer, a desktop computer, a handset, a messaging device, a camera device, a multiprocessor system, a processor-based system, a consumer electronic device, and/or any other computing device.

The illustrative vehicle compute device 400 includes a processor 402, a memory 404, an input/output (I/O) subsystem 406, data storage 408, sensor connector 410, and a display 412. In some embodiments, one or more of the illustrative components of the vehicle compute device 400 may be incorporated in, or otherwise form a portion of, another component. For example, the memory 404, or portions thereof, may be incorporated in the processor 402 in some embodiments.

The processor 402 may be embodied as any type of processor capable of performing the functions described herein. For example, the processor 402 may be embodied as a single or multi-core processor(s), a single or multi-socket processor, a digital signal processor, a graphics processor, a microcontroller, or other processor or processing/controlling circuit. Similarly, the memory 404 may be embodied as any type of volatile or non-volatile memory or data storage capable of performing the functions described herein. In operation, the memory 404 may store various data and software used during operation of the vehicle compute device 400 such as operating systems, applications, programs, libraries, and drivers. The memory 404 is communicatively coupled to the processor 402 via the I/O subsystem 406, which may be embodied as circuitry and/or components to facilitate input/output operations with the processor 402, the memory 404, and other components of the vehicle compute device 400. For example, the I/O subsystem 406 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 406 may form a portion of a system-on-a-chip (SoC) and be incorporated, along with the processor 402, the memory 404, and other components of the vehicle compute device 400 on a single integrated circuit chip.

The data storage 408 may be embodied as any type of device or devices configured for the short-term or long-term storage of data. For example, the data storage 408 may include any one or more memory devices and circuits, memory cards, hard disk drives, solid-state drives, or other data storage devices.

The sensor connector 410 may be embodied as any device or set of devices capable of interfacing with signals coming from the in-line connector 204. For example, the sensor connector 410 may be embodied as wires or circuits configured to accept a digital or analog signal carrying sensor data. In the illustrative embodiment, the sensor connector 410 is connected to one or more wires that form part of the vehicle wiring harness 208. In some embodiments, the sensor connector 410 may be able to transmit data back to the wireless camera 110 or other sensor, either over the same wires as the incoming data signal, over different wires, or through some other means.

The display 412 may be embodied as any type of display on which information may be displayed to a user of the vehicle 102. In the illustrative embodiment, the display 412 is a touch-screen display embedded in or mounted on a dashboard or console of the vehicle 102. The display 412 may be, for example, a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Of course, in some embodiments, the vehicle compute device 400 may include additional components often found in a compute device, such as a communication circuit 414 and/or one or more peripheral devices 416. The communication circuit 414 may be embodied as any type of communication circuit, device, or collection thereof, capable of enabling communications between the vehicle compute device 400 and other devices. To do so, the communication circuit 414 may be configured to use any one or more communication technology and associated protocols (e.g., Ethernet, Bluetooth®, Wi-Fi®, WiMAX, near field communication (NFC), etc.) to effect such communication. The peripheral devices 416 may include buttons, switches, a keyboard, a mouse, etc.

The wireless transceiver 418 of the in-line connector 204 is connected to the sensor connector 410, such as though the vehicle wiring harness 208 and/or one or more additional wires or cables. The wireless transceiver 418 may be embodied as any suitable device capable of performing the functions described herein. For example, the wireless transceiver 418 may be embodied as one or more integrated circuits or chips, a system-on-a-chip, a processor-based system, etc. The wireless transceiver 418 is configured to connect to a one or more wireless sensors 420 over a wireless connection 422, such as a signal at or near 2.4 gigahertz, 5 gigahertz, or 900 megahertz. The wireless transceiver 418 can convert such a wireless signal to a corresponding signal suitable for a wired connection, such as by copying digital data in a wireless signal to digital data on a wired connection or by downconverting analog data from a wireless signal to a lower-frequency analog signal in a wired connection. In some embodiments, the wireless transceiver 418 may have similar components as the vehicle compute device 400 (e.g., a processor 402, a memory 404, an I/O subsystem 406, data storage 408, a communication circuit 414, etc.), a description of which will not be repeated in the interest of clarity.

In some embodiments, the wireless transceiver 418 may perform receive two or more signals, such as two or more video signals from two or more wireless cameras 110. The wireless transceiver 418 may send each video signal received to the sensor connector 410 or the wireless transceiver 418 may be configured to send fewer than all of the received video signals. For example, the user may be able to indicate to the vehicle compute device 400 which wireless camera 110 should be displayed on the display 412, and the vehicle compute device 400 can instruct the wireless transceiver 418 which signal should be sent to the sensor connector 410.

In the illustrative embodiment, the wireless transceiver 418 is not connected to the trailer connector 206. Rather, pins 308 designated for a video signal are not connected the wireless transceiver 418 or any of the pins 304 connecting the in-line connector 204 to the vehicle connector 202. In other embodiments, pins 308 from the trailer connector 206 designated for a video signal are connected to the wireless transceiver 418. In such an embodiment, the wireless transceiver 418 may receive a video signal from the trailer connector 206, from a wireless camera 110, or both. The wireless transceiver 418 may send any or all of the signals received to the sensor connector 410.

In the illustrative embodiment, the wireless sensor 420 is embodied as a wireless camera 110. Additionally or alternatively, in some embodiments, the wireless sensor 420 may be embodied as an audio sensor 424 or an other sensor 426, such as an ultrasound sensor, a radar sensor, a lidar sensor, etc.

It should be appreciated that the vehicle compute device 400 may receive and send signals through the sensor connector 410 from and to the wireless sensor 420 in a similar or identical manner to how the vehicle compute device 400 would receive and send signals from and to a sensor wired to the sensor connector 410. As such, the vehicle compute device 400 may not be aware or may not be able to distinguish whether the sensor is directly coupled to the vehicle compute device 400 by one or more wires or whether the sensor is coupled to the vehicle compute device 400 wirelessly.

Figure 5:
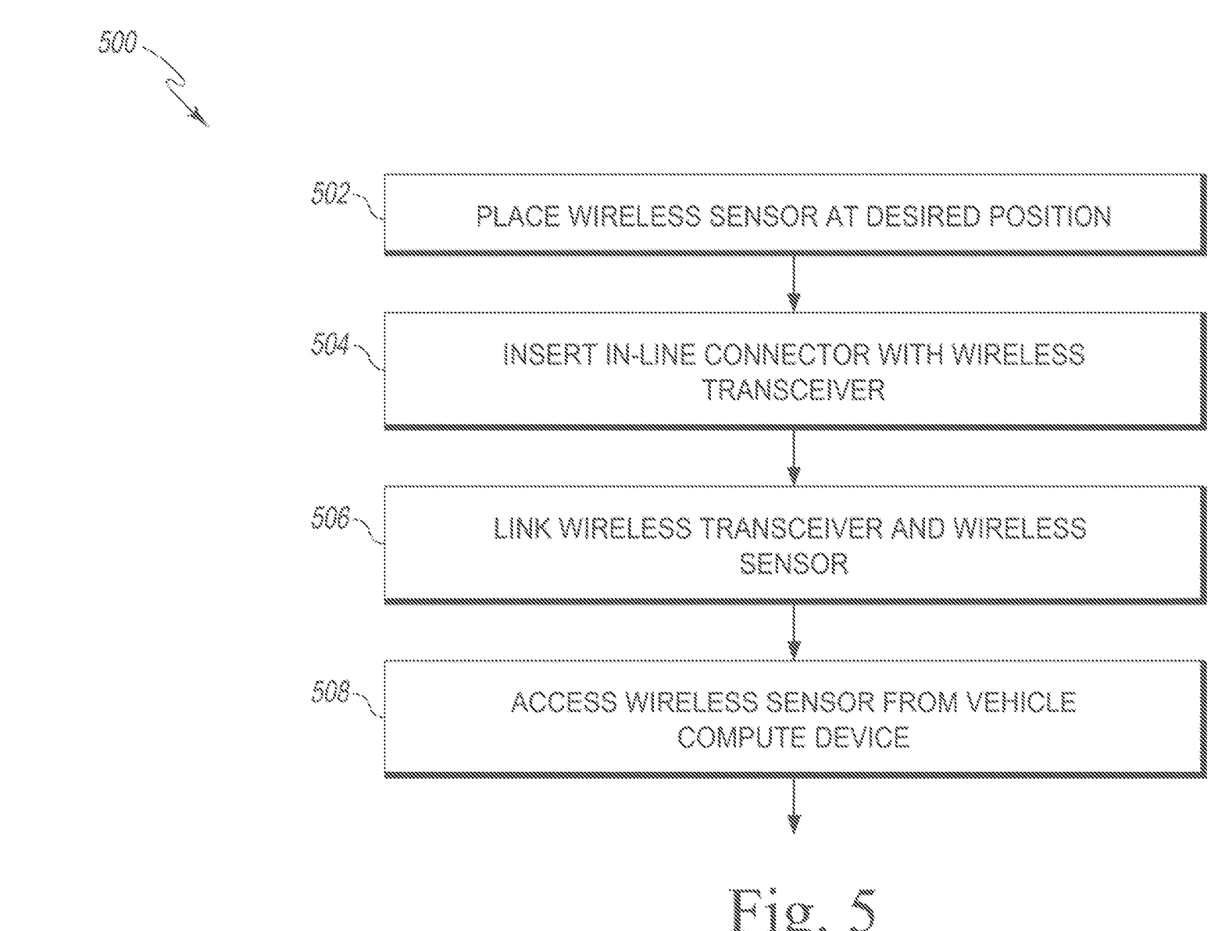
FIG. 5 is a simplified flow diagram of at least one embodiment of a method for connecting a sensor to a vehicle compute device.

Referring now to FIG. 5, in use, a method 500 for connecting a wireless camera 110 or other wireless sensor 420 may be performed. In block 502, a user places a wireless sensor 420 at a desired position, such as on the rear of the trailer 104, in the interior of the trailer 104, or in some other desired location. The user may simply need to place the wireless sensor 420 in a desired position in order to secure the wireless sensor 420 to the trailer 104, such as by magnetic base mount of the wireless sensor 420. In other embodiments, the user may secure the wireless sensor 420 using one or more screws or other fasteners. In the illustrative embodiment, the wireless sensor 420 has a battery, and the user may turn on the wireless sensor 420 by, e.g., pressing a button, flipping a switch, or inserting a battery. In other embodiments, the wireless sensor 420 may have a wired power connection, and the user may plug in the wireless sensor 420 in order to power it.

In block 504, in the illustrative embodiment, the user inserts the in-line connector 204 with the wireless transceiver 418 into the trailer wiring harness assembly 108. In some embodiments, the user may be retrofitting a trailer wiring harness assembly 108 that did not previously include an in-line connector 204 or a wireless transceiver 418.

In block 506, the wireless transceiver 418 and the wireless sensor 420 are linked. In some embodiments, the wireless transceiver 418 and the wireless sensor 420 may automatically link when both devices are powered on. Additionally or alternatively, in some embodiments, the wireless transceiver 418 may be paired with the wireless sensor 420 through a pairing process. The pairing process may be initiated in any suitable manner, such as pressing a button on one or both of the in-line connector 204 and the wireless sensor 420 or through the vehicle compute device 400.

In block 508, the vehicle compute device 400 accesses the wireless sensor 420. The vehicle compute device 400 may receive data such as video data from the wireless sensor 420. In some embodiments, the vehicle compute device 400 may be able to send configuration data or other instructions to the wireless transceiver 418 and/or the wireless sensor 420, such as a desired sensor to receive data from, a desired resolution, a desired zoom level, etc.

The following numbered clauses include embodiments that are contemplated and non-limiting:

Clause 1. An in-line connector for a trailer wiring harness assembly comprising a first connector configured to mate with a vehicle connector of a trailer wiring harness assembly.

Clause 2. The in-line connector of clause 1, any other suitable clause, or any combination of suitable clauses, further comprising a second connector configured to mate with a trailer connector of a trailer wiring harness assembly.

Clause 3. The in-line connector of clause 2, any other suitable clause, or any combination of suitable clauses, further comprising an antenna.

Clause 4. The in-line connector of clause 3, any other suitable clause, or any combination of suitable clauses, further comprising a wireless transceiver connected to the antenna and configured to wirelessly receive a sensor signal from a wireless sensor through the antenna.

Clause 5. The in-line connector of clause 4, any other suitable clause, or any combination of suitable clauses, further comprising one or more wires connecting the wireless transceiver to the first connector.

Clause 6. The in-line connector of clause 5, any other suitable clause, or any combination of suitable clauses, wherein the wireless transceiver is configured to pass the sensor signal through the first connector to the vehicle connector.

Clause 7. The in-line connector of clause 6, any other suitable clause, or any combination of suitable clauses, further comprising the wireless sensor, wherein the wireless sensor is a wireless camera.

Clause 8. The in-line connector of clause 7, any other suitable clause, or any combination of suitable clauses, wherein the wireless camera is battery-powered.

Clause 9. The in-line connector of clause 6, any other suitable clause, or any combination of suitable clauses, further comprising the wireless sensor, wherein the wireless sensor is an audio sensor, an ultrasound sensor, a radar sensor, or a lidar sensor.

Clause 10. The in-line connector of clause 9, any other suitable clause, or any combination of suitable clauses, wherein the wireless sensor is battery-powered.

Clause 11. The in-line connector of clause 6, any other suitable clause, or any combination of suitable clauses, wherein each of the first connector and the second connector has an SAE J3008 interface.

Clause 12. A system comprising the in-line connector of clause 6, any other suitable clause, or any combination of suitable clauses, further comprising a vehicle comprising the vehicle connector.

Clause 13. A system comprising the in-line connector of clause 6, any other suitable clause, or any combination of suitable clauses, further comprising a trailer comprising the trailer connector.

Clause 14. A connector for a trailer wiring harness assembly, wherein the connector is configured to mate with a corresponding connector of a trailer wiring harness assembly.

Clause 15. The connector of clause 14, any other suitable clause, or any combination of suitable clauses, the connector comprising an antenna.

Clause 16. The connector of clause 15, any other suitable clause, or any combination of suitable clauses, further comprising a wireless transceiver connected to the antenna and configured to wirelessly receive a sensor signal from a wireless sensor through the antenna.

Clause 17. The connector of clause 16, any other suitable clause, or any combination of suitable clauses, further comprising one or more wires connected to the wireless transceiver.

Clause 18. The connector of clause 17, any other suitable clause, or any combination of suitable clauses, wherein the connector is a trailer connector of a trailer wiring harness assembly configured to mate with a vehicle connector of a trailer wiring harness assembly, wherein the wireless transceiver is configured to pass the sensor signal through the trailer connector to the vehicle connector.

Clause 19. The connector of clause 17, any other suitable clause, or any combination of suitable clauses, wherein the connector is a vehicle connector of a trailer wiring harness assembly configured to mate with a trailer connector of a trailer wiring harness assembly, wherein the wireless transceiver is configured to pass the sensor signal through the one or more wires to a vehicle compute device, wherein one or more signals of the trailer connector are not passed to a vehicle wiring harness connected to the vehicle connector.

Clause 20. The connector of clause 17, any other suitable clause, or any combination of suitable clauses, further comprising the wireless sensor, wherein the wireless sensor is a wireless camera.

Clause 21. The connector of clause 17, any other suitable clause, or any combination of suitable clauses, further comprising the wireless sensor, wherein the wireless sensor is an audio sensor, an ultrasound sensor, a radar sensor, or a lidar sensor.

Clause 22. The connector of clause 17, any other suitable clause, or any combination of suitable clauses, wherein the connector has an SAE J3008 interface.

Clause 23. A system comprising the in-line connector of claim 6, any other suitable clause, or any combination of suitable clauses, further comprising a vehicle comprising the vehicle connector.

Clause 24. The system comprising the in-line connector of claim 23, any other suitable clause, or any combination of suitable clauses, further comprising a trailer comprising the trailer connector.

Clause 25. A method for connecting a wireless sensor to a vehicle, the method comprising assembling a trailer wiring harness assembly by connecting an in-line connector to a vehicle connector of the vehicle and connecting the in-line connector to a trailer connector of a trailer.

Clause 26. The method of clause 25, any other suitable clause, or any combination of suitable clauses, further comprising securing the wireless sensor to the trailer.

Clause 27. The method of clause 26, any other suitable clause, or any combination of suitable clauses, further comprising wirelessly linking a wireless transceiver of the in-line connector to the wireless sensor.

Clause 28. The method of clause 27, any other suitable clause, or any combination of suitable clauses, further comprising wirelessly transmitting a sensor signal from the wireless sensor to the wireless transceiver.

Clause 29. The method of clause 28, any other suitable clause, or any combination of suitable clauses, further comprising passing, by the in-line connector, the sensor signal to the vehicle connector of the vehicle.

Clause 30. The method of clause 29, any other suitable clause, or any combination of suitable clauses, wherein the wireless sensor is a wireless camera.

Clause 31. The method of clause 29, any other suitable clause, or any combination of suitable clauses, wherein the wireless sensor has a magnetic base, wherein securing the wireless sensor comprises attaching the wireless sensor to the trailer by the magnetic base.

Clause 32. The method of clause 29, any other suitable clause, or any combination of suitable clauses, wherein the wireless sensor is battery-powered, wherein the wireless sensor does not have any wires attached to it while transmitting the sensor signal to the wireless transceiver.

Clause 33. The method of clause 29, any other suitable clause, or any combination of suitable clauses, wherein the in-line connector has one or more SAE J3008 interfaces.

The invention claimed is:

1. An in-line connector for a trailer wiring harness assembly comprising:
- a first connector configured to mate with a vehicle connector of a trailer wiring harness assembly, wherein the first connector comprises a first conductor designated for carrying a first type of sensor signal;
- a second connector configured to mate with a trailer connector of a trailer wiring harness assembly, wherein the second connector comprises a first interface configured to receive a second conductor of the trailer connector designated for carrying the first type of sensor signal;
- an antenna;
- a wireless transceiver connected to the antenna and configured to wirelessly receive a sensor signal of the first type of sensor signal from a wireless sensor through the antenna; and
- one or more wires electrically connecting the wireless transceiver to the first conductor of the first connector, wherein the first interface is electrically disconnected from the wireless transceiver,
- wherein the wireless transceiver is configured to pass the sensor signal through the first connector via the first conductor to the vehicle connector.

2. The in-line connector of claim 1, further comprising the wireless sensor, wherein the wireless sensor is a wireless camera.

3. The in-line connector of claim 2, wherein the wireless camera is battery-powered.

4. The in-line connector of claim 1, further comprising the wireless sensor, wherein the wireless sensor is an audio sensor, an ultrasound sensor, a radar sensor, or a lidar sensor.

5. The in-line connector of claim 4, wherein the wireless sensor is battery-powered.

6. The in-line connector of claim 1, wherein each of the first connector and the second connector has an SAE J3008 interface.

7. A system comprising the in-line connector of claim 1, further comprising a vehicle comprising the vehicle connector.

8. A system comprising the in-line connector of claim 1, further comprising a trailer comprising the trailer connector.

9. A system comprising the in-line connector of claim 1, further comprising:
a vehicle comprising the vehicle connector; and
a trailer comprising the trailer connector.

10. A connector for a trailer wiring harness assembly comprising:
a connector configured to mate with a corresponding connector of a trailer wiring harness assembly;
an antenna;
a wireless transceiver connected to the antenna and configured to wirelessly receive a sensor signal of a first type of sensor signal from a wireless sensor through the antenna; and
one or more wires connected to the wireless transceiver;
wherein the connector comprises a first interface configured to receive a conductor of the trailer wiring harness designated for carrying the first type of sensor signal, and wherein the first interface is electrically disconnected from the wireless transceiver.

11. The connector of claim 10, wherein the connector is a vehicle connector of a trailer wiring harness assembly configured to mate with a trailer connector of a trailer wiring harness assembly,
wherein the wireless transceiver is configured to pass the sensor signal through the one or more wires to a vehicle compute device,
wherein one or more signals of the trailer connector are not passed to a vehicle wiring harness connected to the vehicle connector.

12. The connector of claim 10, further comprising the wireless sensor, wherein the wireless sensor is a wireless camera.

13. The connector of claim 10, further comprising the wireless sensor, wherein the wireless sensor is an audio sensor, an ultrasound sensor, a radar sensor, or a lidar sensor.

14. The connector of claim 10, wherein the connector has an SAE J3008 interface.

15. A method for connecting a wireless sensor to a vehicle, the method comprising:
assembling a trailer wiring harness assembly by connecting an in-line connector to a vehicle connector of the vehicle and connecting the in-line connector to a trailer connector of a trailer, wherein a first conductor of the in-line connector designated for carrying a first type of sensor signal is coupled to the vehicle connector of the vehicle, and wherein a first interface of the in-line connector is coupled to a second conductor of the trailer connector designated for carrying the first type of sensor signal;
securing the wireless sensor to the trailer;
wirelessly linking a wireless transceiver of the in-line connector to the wireless sensor;
wirelessly transmitting a sensor signal of the first type of sensor signal from the wireless sensor to the wireless transceiver; and
passing, by the in-line connector, the sensor signal to the vehicle connector of the vehicle via the first conductor, wherein the second conductor is electrically disconnected from the wireless transceiver.

16. The method of claim 15, wherein the wireless sensor is a wireless camera.

17. The method of claim 15, wherein the wireless sensor has a magnetic base,
wherein securing the wireless sensor comprises attaching the wireless sensor to the trailer by the magnetic base.

18. The method of claim 15, wherein the wireless sensor is battery-powered, wherein the wireless sensor does not have any wires attached to it while transmitting the sensor signal to the wireless transceiver.

19. The method of claim 15, wherein the in-line connector has one or more SAE J3008 interfaces.

* * * * *